United States Patent [19]

Groothuis et al.

[11] Patent Number: 5,581,489
[45] Date of Patent: Dec. 3, 1996

[54] MODEL GENERATOR FOR CONSTRUCTING AND METHOD OF GENERATING A MODEL OF AN OBJECT FOR FINITE ELEMENT ANALYSIS

[75] Inventors: Steven K. Groothuis, Rowlett; Ming J. Hwang, Richardson, both of Tex.; Paul S. Blanton, Aiken, S.C.

[73] Assignee: Texas Instruments Incorporated, Dallas, Tex.

[21] Appl. No.: 176,820

[22] Filed: Jan. 5, 1994

[51] Int. Cl.$^6$ .................................................. G06F 3/00
[52] U.S. Cl. .................. 364/578; 395/500; 364/DIG. 1
[58] Field of Search ............................... 364/578, 476, 364/488, 489, 506, 505, 140, 146, 138, 474.24, 468, 474.05, 474.2; 395/650, 137–139, 119, 161

[56] References Cited

U.S. PATENT DOCUMENTS

| | | | |
|---|---|---|---|
| 4,956,767 | 9/1990 | Stephenson | 364/578 |
| 4,956,787 | 9/1990 | Ito et al. | 364/578 |
| 4,989,166 | 1/1991 | Akasaka et al. | 364/578 |
| 5,208,743 | 5/1993 | Nishikawa | 364/578 |
| 5,257,203 | 10/1993 | Riley et al. | 364/474.05 |
| 5,301,117 | 4/1994 | Riga | 364/474.05 |
| 5,392,227 | 2/1995 | Hiserote | 364/578 |
| 5,408,638 | 4/1995 | Sagawa et al. | 364/578 |
| 5,423,023 | 6/1995 | Batch et al. | 395/500 |
| 5,446,870 | 8/1995 | Hinsberg, III et al. | 364/578 |

*Primary Examiner*—Kevin J. Teska
*Assistant Examiner*—Jacques Louis-Jacques
*Attorney, Agent, or Firm*—W. Daniel Swayze, Jr.; W. James Brady, III; Richard L. Donaldson

[57] ABSTRACT

A model generator and method of generating a model of an object for use in finite element analysis is provided. The model generator (24) includes an input data storage (12) with an output coupled to an input of a materials information generator (14) and an input of a mesh processor (16). The materials information generator (14) has an output coupled to a second input of the mesh processor (16). The mesh processor (16) has an output coupled to a thermal conditions processor (18) and a second output coupled to an output generator (20). The thermal conditions processor (18) has an output coupled to a third input of the mesh processor (16). The output generator (20) has an output coupled to an input of an output storage (22).

20 Claims, 2 Drawing Sheets

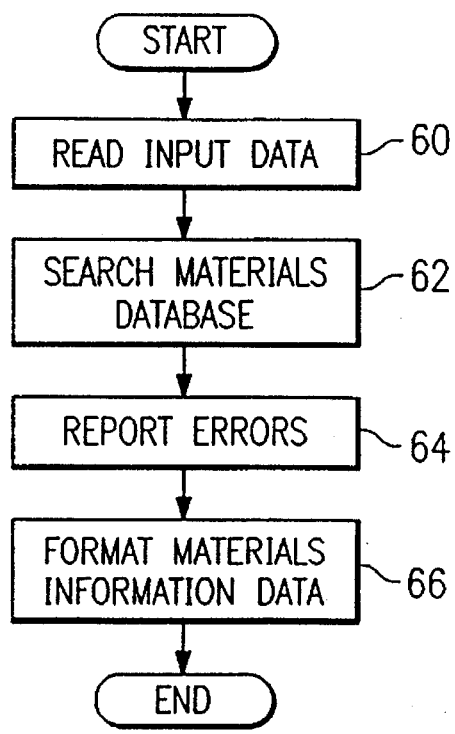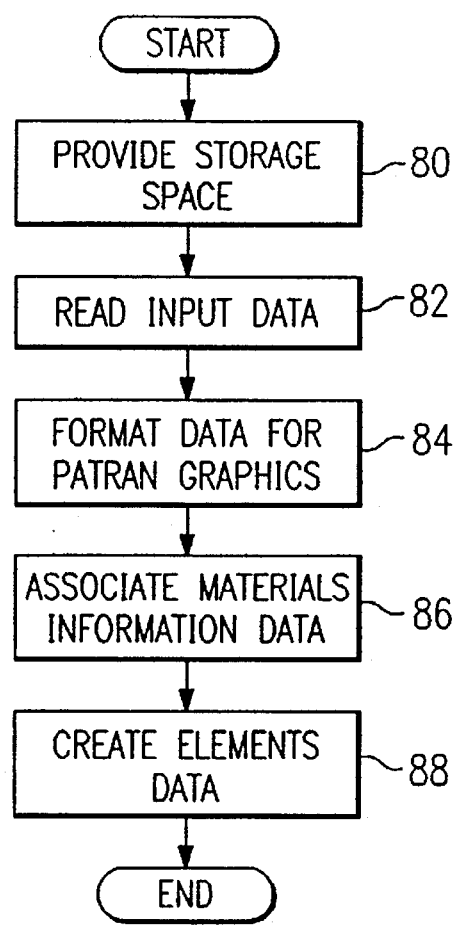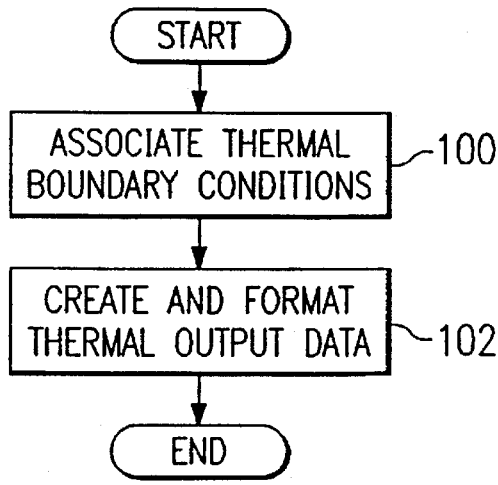

MODEL GENERATOR FOR CONSTRUCTING AND METHOD OF GENERATING A MODEL OF AN OBJECT FOR FINITE ELEMENT ANALYSIS

TECHNICAL FIELD OF THE INVENTION

This invention relates in general to the field of electronic systems and more particularly to an improved model generator and method of generating a model of an object for finite element analysis.

BACKGROUND OF THE INVENTION

It is often useful to analyze an object by modeling the object and conducting a finite element analysis of the model. Finite element analysis consists of modeling the object as a collection of elements and analyzing the model to determine the effects of heat transfer, mechanical stress, and thermal stress on the object. Three-dimensional modeling is accomplished by subdividing the object into volume elements and generating a mesh with those volume elements. Generating a mesh constitutes associating material and thermal properties with each volume element. After the object has been meshed, the mesh volume elements can be used to conduct a finite element analysis of the object using one of several commercially available finite element analysis processors such as the products sold by SWANSON ANALYSIS SYSTEMS, INC. under the trademark ANSYS®, by ADINA R & D, INC. under the trademark ADINA®, and by HIBBITT, KARLSSON, & SORENSON, INC. under the trademark ABAQUS®.

Two-dimensional modeling of an object is accomplished by subdividing the object into area elements and generating a mesh with those area elements. Similar to the three-dimensional analysis, the mesh area elements are used to conduct a finite element analysis of the object in two dimensions. A finite element analysis processor uses the mesh area elements of a modeled object and analyzes the effect of boundary value field equations. Both two-dimensional and three-dimensional finite element analysis of an object can analyze the effect of heat transfer, mechanical stress, and thermal stress on the object. The result of a finite element analysis is to predict the effect on an object of heat transfer, mechanical stress, and thermal stress.

SUMMARY OF THE INVENTION

A need has arisen for an improved model generator and method of generating a model of an object for finite element analysis.

In accordance with the present invention, a model generator and a method of generating a model of an object is provided that substantially eliminates or reduces the disadvantages and problems associated with prior modeling systems.

According to one embodiment of the present invention, a model generator for constructing a model of an object for finite element analysis is provided that includes a first storage having an output and is operable to store input data comprising information describing a plurality of characteristics of an object to be modeled, wherein the plurality of characteristics comprise a plurality of divisions, subdivisions, and materials. A materials information generator is coupled to the first storage. The materials information generator is operable to provide materials information data defining the plurality of materials described by the input data. A mesh processor is coupled to the materials information generator and to the first storage. The main processor is operable to associate the materials information data with the plurality of divisions described by the input data and to create elements data defining a plurality of elements subdividing the plurality of divisions using the plurality of subdivisions. An output generator is coupled to the main processor and is operable to format model output data for use by a finite element analysis processor. A second storage is coupled to the output generator and is operable to store the model output data.

According to a further embodiment of the present invention, a method of generating a model of an object for finite element analysis is provided that may comprise several steps. The first step provides input data comprising information describing a plurality of characteristics of an object to be modeled, wherein the plurality of characteristics comprise a plurality of divisions, subdivisions, and materials. The second step provides materials information data defining the plurality of materials described by the input data. The third step automatically associates the materials information data with the plurality of divisions described by the input data and automatically creates elements data defining a plurality of elements subdividing the plurality of divisions using the plurality of subdivisions. The last step automatically formats model output data for use by a finite element analysis processor.

BRIEF DESCRIPTION OF THE DRAWINGS

A more complete understanding of the present invention may be acquired by referring to the following description taken in conjunction with the accompanying drawings in which like reference numbers indicate like features and wherein:

FIG. 3 illustrates a flow chart of the process used to provide materials information data;

FIG. 4 illustrates a flow chart of the mesh process; and

FIG. 5 illustrates a flow chart of the thermal conditions process.

DETAILED DESCRIPTION OF THE INVENTION

Before performing a finite element analysis of an object to simulate heat transfer and thermal-mechanical stress on the object, the physical features and material properties of the object may be modeled by a mesh of elements. The most labor-intensive portion of the modeling and simulation process is this pre-processing phase in which the characteristics of the object are modeled. Many available commercial software programs require extensive training, computer graphics experience, and are bundled with expensive analysis programs. Generation of the model of mesh elements often is performed by manual drafting and data entry into a format that a finite element analysis processor will accept.

One technical advantage of the present invention is that it provides fast model generation for two and three-dimensional models that can be analyzed using stress, thermal, and electrical simulations. The automation of the model generation is achieved, in part, through the use of formatted input data. This formatted input data allows the model generator of the present invention to be more flexible, to provide input data error checking, options to construct orthogonal and radial geometries, and to produce less output data. The present invention allows the construction of a geometric model of elements with associated material and physical properties which is necessary as input for a finite element analysis processor. Examples of commercially available finite element analysis processors are ADINA®, ABAQUS® and ANSYS®.

A further technical advantage of the present invention is that with only approximately sixty lines of input data describing characteristics of the object to be modeled, such as geometric descriptions, material properties and boundary conditions, the present invention performs two and three-dimensional model definitions, intermediate calculations of geometric representations, mapping of material properties over the area or volume elements and formatting of output data for the particular finite element analysis processor being used.

Further technical advantages of the present invention are the capability to provide two and three-dimensional model generation, mapping of material properties across regions, error checking of initial input data, extraction of cross-section geometry, orthogonal and radial symmetry, and specific formatting of thermal and thermal-mechanical simulations.

A further technical advantage of the present invention is its flexibility to format output data for a variety of finite element analysis systems. The present invention is adaptable to any finite element analysis system which can accept ASCII-type input files or similar generally accepted data transfer formats.

Figure 1:
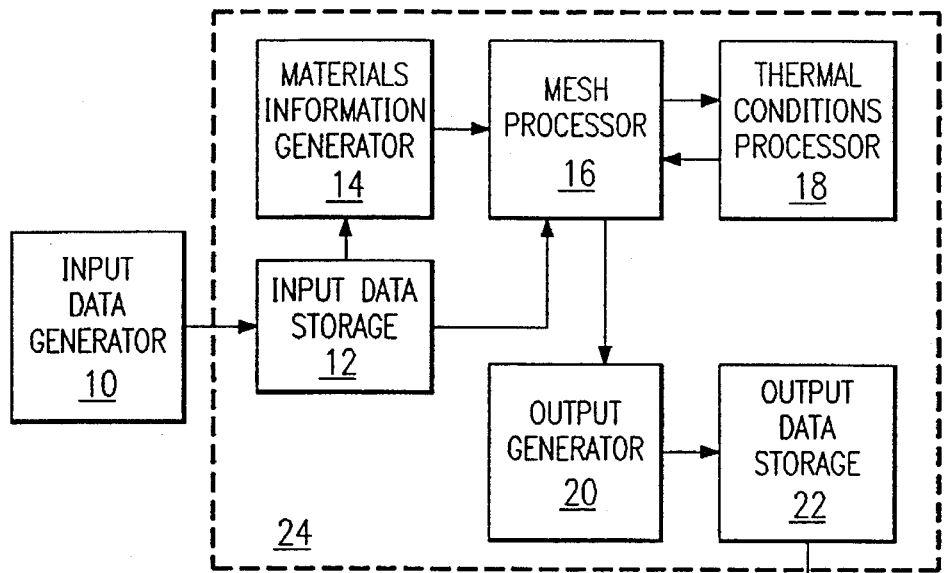
FIG. 1 illustrates a block diagram of a finite element analysis system including one embodiment of the present invention.

FIG. 1 illustrates a block diagram of a finite element analysis system. Referring to FIG. 1, an input data generator 10 has an output coupled to an input of an input data storage 12. The input data storage 12 has an output coupled to an input of a materials information generator 14 and an input of a mesh processor 16. The materials information generator 14 has an output coupled to an input of the mesh processor 16 which has an output coupled to an input of a thermal conditions processor 18 and an output coupled to an output generator 18. The thermal conditions processor 18 has an output coupled to an input of the mesh processor 16. The output generator 20 has an output coupled to an input of an output data storage 22. Together, the input data storage 12, the materials information generator 14, the mesh processor 16, the thermal conditions processor 18, the output generator 20, and the output data storage 22 comprise a model generator for constructing a model of an object 24. The output data storage 22 has an output coupled to an input of a finite element analysis processor 26 which has an output coupled to an input of a display 28.

In operation, the finite element analysis system illustrated in FIG. 1 analyzes the effects of heat transfer and thermal-mechanical stress on an object being modeled. The input data generator 10 operates to generate input data which includes information describing the geometry, materials and boundary conditions of an object to be modeled. The geometry of the object is described by divisions and subdivisions. In a two-dimensional model, the divisions divide the object into areas. In a three-dimensional model, the divisions divide the object into volumes. The input data generator 10 provides input data in a format such that the information described by the input data can be recovered by parsing through the input data. The input data generated by the input data generator 10 includes all information necessary for constructing a model of an object to be analyzed using the finite element analysis processor 26. The input data generator 10 provides the input data to the input data storage 12.

The input data storage 12 stores the input data in the format provided by the input data generator 10, and provides the input data to the materials information generator 14 and the mesh processor 16. In one embodiment of the present invention, input data storage 12 comprises a magnetic storage medium such as a magnetic disk, hard drive, tape drive or other magnetic storage.

The materials information generator 14 operates to generate materials information data and to provide the materials information data to the mesh processor 16. The materials information generator 14 reads the input data to determine what materials have been defined by the input data for the object to be modeled. The materials information generator includes a database holding information defining predetermined materials that might be used to describe the object to be modeled. The materials information generator 14 uses the list of materials defined by the input data to search the materials database and produce materials information data fully defining each material listed in the input data. The information included in the materials information data includes such things as the thermal conductivity and density of the material. The materials information generator 14 provides the materials information data to the mesh processor in a format from which the mesh processor 16 can recover the descriptions of the materials.

In operation, the mesh processor 16 reads the information included in the input data and the materials information data. The mesh processor 16 uses this information to create a mesh for the object to be modeled. The mesh comprises elements data defining a number of elements subdividing the object. This elements data is provided as an input to the finite element analysis processor 26. The mesh processor 16 includes storage space to associate divisions defined within the object to be modeled with elements generated in the creation of the elements data. The mesh processor 16 reads whether the model-type is two or three-dimensional from the input data and creates the elements data accordingly. In one embodiment of the present invention, the mesh processor 16 formats the geometry information held in the input data for PATRAN® graphics. The mesh processor 16 associates materials to the divisions defined within the object to be modeled using the materials information data provided by the materials information generator 14. After associating the materials, the mesh processor 16 associates subdivisions within the divisions defined in the object to be modeled. The divisions within the object to be modeled can be either areas or volumes depending upon whether the model type is a two or three-dimensional model. The subdivisions then define either smaller areas or smaller volumes. The mesh processor 16 replicates or truncates the information described by the input data based upon the symmetry type of the model. Once the mesh processor 16 has created the elements data, the mesh processor 16 checks whether the model is a thermal model. If the model is a thermal model, the mesh processor 16 signals the thermal conditions processor 18 to create thermal output data.

The thermal conditions processor 18 operates to associate convection, radiation, specified temperature, and heat generation surfaces and power volumes or areas with the elements created by the mesh processor 16. The thermal conditions processor 18 formats these thermal boundary conditions and provides thermal output data to the mesh processor 16. The thermal output data is formatted by the thermal conditions processor 18 as appropriate for input to the type of finite element analysis processor 26 being used. Once the thermal conditions processor 18 has created thermal output data, the mesh processor 16 provides the elements data and the thermal output data to the output generator 20.

In operation, the output generator 20 formats the information contained in the elements data and the thermal output data into the proper form for input to the type of finite element analysis processor 26 to be used in the analysis. The output data generated by the output generator 20 includes such software specific analysis controls as headings, printout flags, and post processing commands. The output generator 20 is operable to produce output data appropriate for a number of finite element analysis processors 26. The output generator provides output data to the output data storage 22.

The output data storage 22 stores the output data and provides the output data to the finite element analysis processor 26. In one embodiment of the present invention, the output data storage 22 comprises a magnetic storage medium such as a magnetic disk, hard drive, tape drive or other magnetic storage.

The model generator 24 operates as a unit to construct a model of an object to be analyzed from the description of the object in the input data. The model generator 24 provides the finite element analysis processor 26 with output data including all information necessary for the analysis in the format required by the finite element analysis processor 26.

In operation, the finite element analysis processor 26 uses the output data provided by the output data storage 22 to analyze the object being modeled. The finite element analysis processor 26 can be any of a number of commercially available finite elements analysis programs. In one embodiment of the present invention, the finite element analysis processor comprises either ADINA®, ABAQUS® or ANSYS®. The finite element analysis processor 26 simulates the effects of physical and thermal stress on the object for a period of time and computes the result of those stresses. The finite element analysis processor 26 analyzes each of the elements defined by the output data, analyzes the effect of thermal and physical stress on each of the elements and computes the effect of the stresses on the overall object structure. After analyzing the object with respect to the stresses simulated, the finite element analysis processor 26 provides the result to the display 28.

The display 28 displays the result of the finite element analysis in a form that can be readily understood. In one embodiment of the present invention, the display 28 is a video display operable to represent temperature and stress values by using different shades or colors. The display may comprise any form of display that conveys the results computed by the finite element analysis processor 26.

Figure 2:
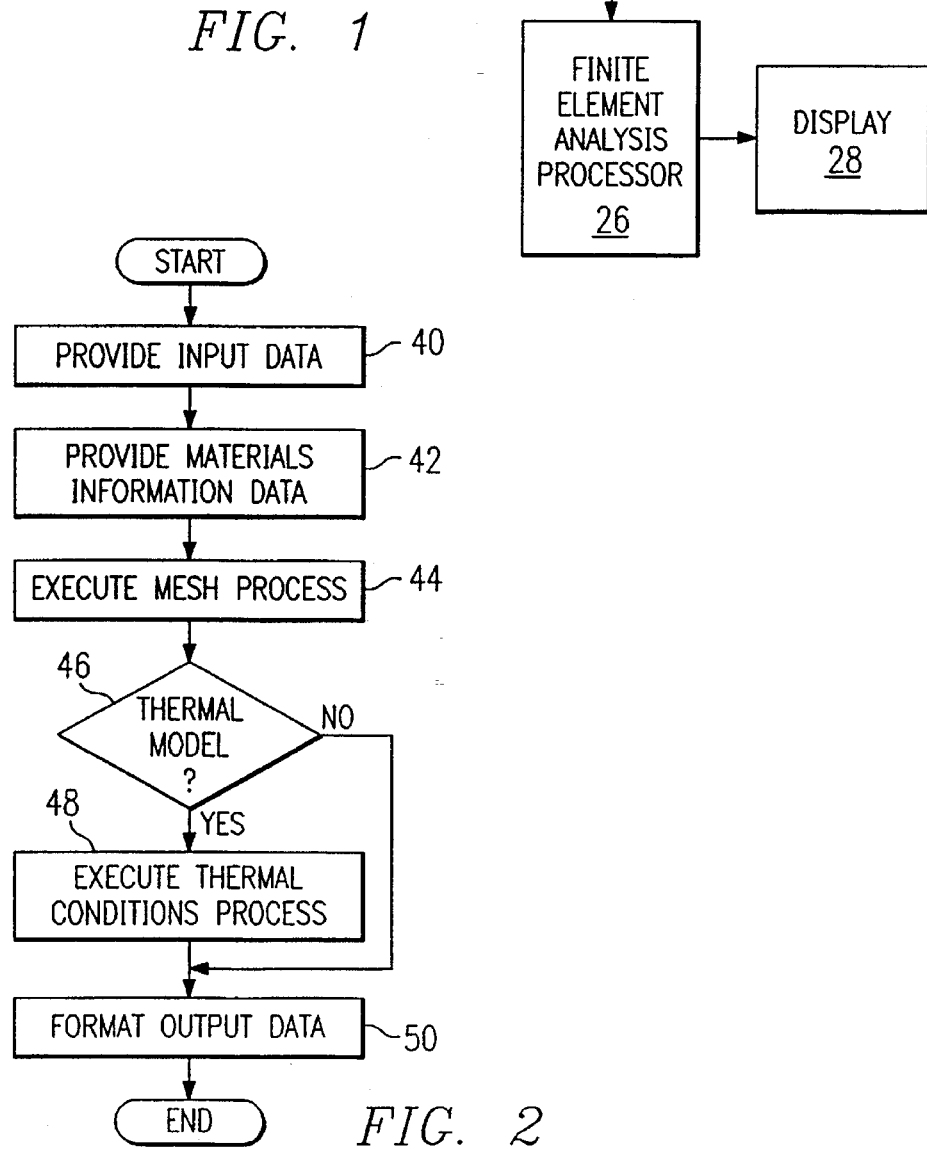
FIG. 2 illustrates a flow chart of the method of generating a model of an object according to the teachings of the present invention.

FIG. 2 illustrates a flow chart of a method of generating a model of an object for a finite element analysis according to the teachings of the present invention. The method begins at step 40 where input data is provided. The input data includes information describing the geometry, materials, and boundary conditions of the object to be modeled. The geometry of the object includes divisions and subdivisions dividing the object into areas or volumes. The divisions divide the object into areas if the model is a two-dimensional model, and the divisions divide the object into volumes if the model is a three-dimensional model. The subdivisions divide the areas or volumes into smaller areas of volumes. The input data assigns a material to each division of the object. If the model is a thermal model, the input data also describes the thermal boundary conditions for the object. The input data provided in step 40 is formatted such that the information included in the input data can be recovered by reading the input data. In one embodiment of the present invention, the input data includes the information and is formatted as shown in TABLE 1.

TABLE 1

```
; Heading card for this job
100qfp-2 Steady State Thermal Analysis
; Program selection code (1=adina, 2=adinat, 3=AbaqusS,
4=AbaqusT, 5=AnsysS, 6=AnsysT)
    6
; model type (0=1/1, 1=1/2, 2=1/4, 3=1/4 brick/radial,
4=1/8 radial)  Units
    0       3
; dimension (2:2-d, 3:3-d)
    3
; NX    NY    NZ (-1)
    27    29    33
; X coordinates (division #)
    0.00000e+00        X(1)
. . . .
    8:52100e+02        X(28)
; Y coordinates (division #)
    0.00000e+00        Y(1)
. . . .
    1:75000e+03        Y(30)
; Z coordinates (division #)
    0.00000e+00        Z(1)
. . . .
    2:50000e+03        Z(34)
; No. vols, No. mats, No. diags, LOWER L/F, UPPER L/F
    30    8    0  8.24000e+02 8.74000e+02
; Volume ouputs
    8.40000e+02  8.43000e+02  1.22500e+03  1.65300e+03
9.75000e+02  1.52500e+03  5   lead to pkg
. . . .
    0.00000e+00  5.00000e+02  0.00000e+00  1.75000e+03
0.00000e+001  2.50000e+03  8   Large brd
; material outputs
    1       42 Epoxy-Glass (FR-4, 55% epoxy)
    2       21 Gold Silicon (97/3)
. . . .
    7       24 Kovar
    8        6 Copper
; Diagonal relations
; T,No T    Tperiods Tdelta Icon #temps #conv #pwrs itemp
ambient #rads
    0     1    1.000000    0    5    13    1    0.000000
8.00000e+01 13
; Constant Temperature Surfaces
; X1        X2          Y1           Y2         Z1
    Z2           TEMPERATURE
    7.50000e+02  7.50000e+02  6.25000e+02  1.12500e+03
1.00000e+03  1.50000e+03  8.00000e+01  top s-brd
. . . .
    5.00000e+02 5.00000e+02 1.12500e+03 1.75000e+03
0.00000e+00 2.50000e+03 8.00000e+01  y2 side brd
; Convection Surfaces
; X1        X2          Y1           Y2         Z1
    Z2             C Coef. W/mils2-C
    8.40000e+02 8.40000e+02 5.25000e+02 6.17500e+02
9.00000e+02 1.60000e+03 2.24017e-08  y1 top pkg
. . . .
    8:43000e+02 8.43000e+02 6.00000e+02 1.15000e+03
4.72000e+02 9.00000e+02 1.56800e-08  lead4
; Radiation Surfaces
; X1        X2          Y1           Y2         Z1
    Z2          Emissivity
    8.40000e+02 8.40000e+02 5.25000e+02 6.17500e+02
9.00000e+02 1.60000e+03 5.00000e-01  y1 top pkg
. . . .
    8.43000e+02 8.43000e+02 6.00000e+02 1.15000e+03
4.72000e+02 9.00000e+02 3.00000e-01  lead4
; Power Volumes
; X1        X2          Y1           Y2         Z1
    Z2          Power
```

TABLE 1-continued

```
7.91000e+02 8.06000e+02 7.55000e+02 9.95000e+02
1.13000e+03 1.37000e+03 1.05000e+01 chip power
```

The input data shown in TABLE 1 includes information describing the type of model, the geometries of the object, the materials, and the boundary conditions. For example, the input data shown in TABLE 1 describes the model as a steady-state thermal analysis, the finite element analysis processor as ANSYST, the model type as full symmetry, the units as mils, and the model as a three-dimensional model. The units defined in the input data can be either microns, millimeters, inches or mils. The NX, NY and NZ in TABLE 1 define the subdivisions of the object. Following these subdivisions are the X, Y, and Z coordinates of each division. The divisions define volumes because the model is three-dimensional. Next, the input data defines the number of volumes, number of materials, number of diagonals, the lower lead frame and the upper lead frame. The input data then defines the volumes of the object by defining the diagonal corners of a rectangular prism and defines the material associated with the volumes. After the volume definitions, the input data lists the materials associated with the volumes of the object. Next, the input data defines whether or not the model has transients, the time periods, and the time delta. The input data then defines the number of initial conditions, the number of temperature surfaces, the number of convection surfaces, and the number of power volumes. The input data also defines the initial temperature, the ambient temperature, and the number of radiation surfaces. Following these definitions, the input data defines the constant temperature surfaces, the convection surfaces, the radiation surfaces and the power volumes by defining either the surface or the volume and other necessary information for the definition. For example, the temperature surfaces are defined by two points on the plane containing the surface and the temperature of the surface. The convection surfaces are defined by two points on the plane and the convection coefficient. The radiation surfaces are defined by two points on the plane and the emissivity, and the power volumes are defined by two diagonals of the volume and the power of the volume.

After providing input data in step 40, the method executes step 42 where materials information data is provided. In step 42, the input data is read to find the list of materials associated with the divisions of the object. A database of material properties is searched to find the materials information matching the materials defined in the input data. Each material found in the input data is included in the materials information data along with information defining that material. The materials information data includes such information as the thermal conductivity and density of the material. In one embodiment of the present invention, the materials information data provided in step 42 is provided in the format shown in TABLE 2.

TABLE 2

```
/com, ** ===
/com, ** === Material Data Section      ===
/com, ** ===
/com, ***
/com, *** MATERIAL # 1 = Epoxy-Glass (FR-4, 55% epoxy)
/com, *** Thermal Conductivity [W/mm-C]
/com, ***
mptemp
```

TABLE 2-continued

```
mptemp, 1,   25.0
mpdata, kxx,       1, 1, 2.90E-04
/com, ***
/com, *** MATERIAL # 2 = Epoxy
/com, *** Thermal Conductivity [W/mm-C]
/com, ***
mptemp
mptemp, 1,   25.0
mpdata, kxx,     2, 1, 1.50E-03
/com, ***
/com, *** MATERIAL # 3 = Silicon (111)
/com, *** Thermal Conductivity [W/mm-C]
/com, ***
mptemp
mptemp, 1, -23.0,   27.0,   77.0,   127.0
mptemp, 5,  227.0
mpdata, kxx,     3, 1, 1.91E-01, 1.48E-01, 1.19E-01,
9.89E-02
mpdata, kxx,     3, 5, 7.62E-02
/com, ***
/com, *** MATERIAL # 4 = Mold Compound
/com, *** Thermal Conductivity [W/mm-C]
/com, ***
mptemp
mptemp, 1, 25.0
mpdata, kxx,     4, 1, 1.16E-03
/com, ***
/com, *** MATERIAL # 5 = Copper (CDA 18030)
/com, *** Thermal Conductivity [W/mm-C]
/com, ***
mptemp
mptemp, 1, 25.0
mpdata, kxx,     5, 1, 3.01E-01
```

The materials information data shown in TABLE 2 includes information for defining the characteristics of those materials. Further details of step 42 are set forth in the flow chart illustrated in FIG. 3.

After providing materials information data in step 42, the method executes the mesh process in step 44. In step 44, the materials information data is associated with the divisions of the object to be modeled and elements data is created. This mesh process of step 44 is illustrated in detail in the flow chart illustrated in FIG. 4.

After step 44, the method checks whether the model is a thermal model in step 46. If the model is a thermal model, the method executes the thermal conditions process in step 48. If the model is not a thermal model, the method formats output data in step 50.

In step 48, the method executes the thermal conditions process which associates thermal boundary conditions and creates thermal output data. The thermal conditions process of step 48 is illustrated in detail in the flow chart illustrated in FIG. 5.

In step 50, the output data is formatted. The formatting of output data in step 50 includes formatting the elements data and thermal output data to create model output data that the finite element analysis processor can understand and use. This formatting of model output data includes providing essential analysis controls for the finite element analysis processor such as headings, printout flags, and post-processing commands. In one embodiment of the present invention, the model output data can be formatted for ADINA®, ABAQUS® and ANSYS® finite element analysis processors. The method illustrated in the flow chart of FIG. 2 operates to generate a model of an object which is used by a finite element analysis processor to conduct an analysis which simulates thermal and physical stress on the object being modeled.

FIG. 3 illustrates a flow chart of the process used to provide materials information data in step 42 of FIG. 2. The method begins at step 60 where input data is read. In step 60, the method reads the input data provided by step 40 of FIG. 2. In step 60, the method reads the input data to find a list of the materials associated with divisions of the object to be modeled.

Following step 60, the method searches the materials database in step 62. The materials database includes information about available materials which can be associated with divisions of an object to be modeled. The materials database includes such information as the thermal conductivity and density of the materials. After step 62, the method reports errors in step 64. Errors are reported if information about a material is incomplete or missing in the materials database. The input data read in step 60 defines whether the model was stress or thermal, the finite element analysis processor type, and the temperature boundary conditions. This information is used in selecting materials information from the materials database in step 62. In step 62, the search of the materials database finds the respective material properties and limits the material properties to what is needed as indicated in the input data.

The final step of the process is to format materials information data in step 66. In step 66, the process creates materials information data formatted for the requisite finite element analysis processor. The materials information data is available for retrieval in the further steps of the method illustrated in FIG. 2. The materials information data produced by step 66 provides a formatted list of the materials and the characteristics of those materials. In one embodiment of the present invention, the materials information data is formatted as shown in TABLE 2 as discussed above.

FIG. 4 illustrates a flow chart of the mesh process of step 44 of FIG. 2. The mesh process begins at step 80 where data storage space is provided. This storage space is to provide space to link divisions of the object to be modeled to elements that are later created. The divisions of the object to be modeled are either areas or volumes depending upon whether the model is a two-dimensional or three-dimensional model. The method proceeds to step 82 where the mesh process reads the input data provided by the provide input data step 40 of FIG. 2. The mesh process reads input data in step 82 to recover information about the geometries of the structure of the object to be modeled.

After reading input data in step 82, the mesh process formats data for graphics display in step 84. Step 84 is not essential to the operation of the mesh process, but is included to allow the display of the geometry of the structure of the object using a graphics program. One embodiment of the present invention utilizes a graphics product sold by PDA ENGINEERING, INC. under the trademark PAT-RAN®.

After step 84, the mesh process associates materials information data in step 86. In step 86, the mesh process retrieves the materials information data provided by the provide materials information data step 42 of FIG. 2 and associates materials to the divisions within the object to be modeled. Each division, whether it be an area or a volume, is assigned a material in the input data and was included in the materials information data. Step 86 associates the information in the materials information data with the divisions defined by the input data.

The next step of the mesh process is to create elements data in step 88. In step 88, the mesh process associates subdivisions of the object to be modeled with the divisions of the object. Thus, if the model is a two-dimensional model, areas are subdivided into smaller areas. If the model is a three-dimensional model, volumes are subdivided into smaller volumes. The subdivisions are elements of the object to be modeled and are used by the finite element analysis processor as the elements of the analysis. In step 88, the mesh process generates nodes and elements based upon the divisions of the object to be modeled and the subdivisions of the object. The mesh process also replicates or truncates parts of the model based on the symmetry-type indicated in the input data. For example, in one embodiment of the present invention, the model can use half-symmetry. Half-symmetry means that only half the model must be defined by the input data. If only half the model is defined, the mesh process can replicate that half to create the entire object. On the other hand, if the entire object has been defined by the input data and half-symmetry is indicated, the mesh process can truncate half of the model of the object. Thus, only half of the object needs to be modeled because of the symmetry of the model. The method concludes at step 88.

FIG. 5 illustrates a flow chart of the thermal conditions process of step 48 of FIG. 2. The thermal conditions process begins at step 100 where thermal boundary conditions are associated with selected nodes or elements. In step 100, the thermal conditions process associates convection surfaces, radiation surfaces, temperature surfaces, and power volumes with nodes or elements created by the mesh process in step 44 of FIG. 2. After step 100, the thermal conditions process creates and formats thermal output data in step 102. Step 102 creates and formats the thermal boundary conditions into thermal output data for the selected finite analysis processor. Thus, the format includes the information in the form needed by whichever finite element analysis program is used to conduct the ultimate analysis of the object.

One technical advantage of the present invention is that it allows the definition of boundary conditions at either the division level or the subdivision level of the object. For example, if the model is a three-dimensional model, the present invention allows for definition of boundary conditions associated with each volume within the object to be modeled or within each element of the object. It is a technical advantage of the present invention that both divisions and subdivisions are defined and either set can be used for boundary conditions.

A further technical advantage of the present invention is that the present invention automatically creates output data of approximately one hundred pages or more which is necessary for input into a finite element analysis processor from input data of only one or two pages. The model generation process is automated, materials are automatically associated with divisions and subdivisions of the objects to be modeled and symmetry is used in the generation of the model. Thus, the present invention allows the definition of an object to be modeled using a relatively small amount of data taking up only one or two pages of data. The present invention then automatically creates output data which comprises numerous pages of data fully defining the object in a format necessary for input into a finite element analysis processor. The present invention provides a flexible and powerful tool for use in modeling an object for a finite element analysis of the object.

Although the present invention has been described in detail, it should be understood that various changes, substitutions and alterations can be made hereto without departing from the spirit and scope of the invention as defined by the appended claims.

What is claimed is:

1. An apparatus for constructing a model of an object for a finite element analysis of the object, comprising:

a first storage operable to store input data comprising information describing a plurality of characteristics of an object to be modeled, wherein the plurality of characteristics comprise a plurality of divisions, subdivisions, and materials;

a material information generator coupled to the first storage, the material information generator being operable to provide materials information data defining the plurality of materials described by the input data;

a mesh processor coupled to the material information generator and to the first storage, the mesh processor being operable to associate the materials information data with the plurality of divisions described by the input data and to create elements data defining a plurality of elements subdividing the plurality of divisions using the plurality of subdivisions;

an output generator coupled to the mesh processor, the output generator being operable to create and format model output data for use by a finite element analysis processor; and a second storage coupled to the output generator, the second storage operable to store the model output data.

2. The apparatus of claim 1, wherein the plurality of characteristics described by the input data further comprises a plurality of thermal boundary conditions, the model generator further comprising:

a thermal conditions processor coupled to the mesh processor, the thermal conditions processor being operable to associate with the plurality of divisions and elements the plurality of thermal boundary conditions and being operable to create and format thermal output data for the model output data.

3. The apparatus of claim 1, wherein the model comprises a two-dimensional model and wherein the plurality of divisions comprises a first plurality of areas and the plurality of subdivisions comprises a second plurality of areas.

4. The apparatus of claim 1, wherein the model comprises a three-dimensional model and wherein the plurality of divisions comprises a first plurality of volumes and the plurality of subdivisions comprises a second plurality of volumes.

5. The apparatus of claim 1, wherein the materials information generator, the mesh processor and the output generator comprise computer software programs.

6. The apparatus of claim 1, wherein the first storage comprises a magnetic storage medium in a computer system.

7. The apparatus of claim 1 wherein the second storage comprises a magnetic storage medium in a computer system.

8. A finite element analysis apparatus for analyzing a model of an object, comprising:

an input data generator operable to generate input data comprising information describing a plurality of characteristics of an object to be modeled, wherein the plurality of characteristics comprise a plurality of divisions, subdivisions, and materials;

a model generator coupled to the input data generator being operable to construct a model of an object, the model generator comprising:

a first storage coupled to the input data generator, the first storage being operable to store the input data;

a material information generator coupled to the first storage, the material information generator operable to provide materials information data defining the plurality of materials described by the input data;

a mesh processor coupled to the material information generator and to the first storage, the mesh processor being operable to associate the materials information data with the plurality of divisions described by the input data and to create elements data defining a plurality of elements subdividing the plurality of divisions using the plurality of subdivisions;

an output generator coupled to the mesh processor, the output generator operable to create and format model output data for use by a finite element analysis processor; and a second storage coupled to the output generator, the second storage being operable to store the model output data;

a finite element analysis processor coupled to the second storage of the model generator; and a display coupled to the finite element analysis processor.

9. The finite element analysis apparatus of claim 8, wherein the plurality of characteristics described by the input data further comprises a plurality of thermal boundary conditions, and wherein the model generator further comprises:

a thermal condition processor coupled to the mesh processor, the thermal condition processor being operable to associate with the plurality of divisions and elements the plurality of thermal boundary conditions and operable to create and format thermal output data includable in the model output data.

10. The finite element analysis apparatus of claim 8, wherein the model comprises a two-dimensional model and wherein the plurality of divisions comprises a first plurality of areas and the plurality of subdivisions comprises a second plurality of areas.

11. The finite element analysis apparatus of claim 8, wherein the model comprises a three-dimensional model and wherein the plurality of divisions comprises a first plurality of volumes and the plurality of subdivisions comprises a second plurality of volumes.

12. The finite element analysis apparatus of claim 8, wherein the materials information generator, the mesh processor and the output generator comprise computer software programs.

13. The finite element analysis apparatus of claim 8, wherein the first storage and the second storage comprise a magnetic storage medium in a computer system.

14. A computer-implemented method of generating a model of an object for a finite element analysis of the object, comprising the steps of:

providing input data comprising information describing a plurality of characteristics of an object to be modeled, wherein the plurality of characteristics comprise a plurality of divisions, subdivisions, and materials;

providing materials information data defining the plurality of materials described by the input data;

associating the materials information data with the plurality of divisions described by the input data and creating elements data defining a plurality of elements subdividing the plurality of divisions using the plurality of subdivisions; and creating and formatting model output data for use by a finite element analysis processor.

15. A computer-implemented method of claim 14, wherein the step of providing input data comprises input data wherein the plurality of characteristics further comprises a plurality of thermal boundary conditions, the method further comprising the steps of:

associating with the plurality of divisions and elements the plurality of thermal boundary conditions;

creating and formatting thermal output data; and combining the thermal output data with the model output data.

16. A computer-implemented method of claim 14, wherein the step of providing input data comprises input data describing a two-dimensional model and wherein the plurality of divisions comprises a first plurality of areas and the plurality of subdivisions comprises a second plurality of areas.

17. A computer-implemented method of claim 14, wherein the step of providing input data comprises input data describing a three-dimensional model and wherein the plurality of divisions comprises a first plurality of volumes and the plurality of subdivisions comprises a second plurality of volumes.

18. A computer-implemented method of claim 14, wherein the steps of providing materials information data, automatically associating the materials information data and automatically creating elements data, and automatically creating and formatting model output data are conducted by a computer software program.

19. A computer-implemented method of claim 14, wherein the method further comprises the steps of:

storing the input data; and storing the model output data.

20. A computer-implemented method of claim 14, wherein the method further comprises the steps of:

storing the input data in a magnetic storage medium in a computer system; and storing the output data in the magnetic storage medium.

* * * * *